United States Patent Office 3,502,621
Patented Mar. 24, 1970

3,502,621
POLYURETHANES BASED ON A POLYESTER HAVING NITRILOTRIACETIC ACID AS A COMPONENT
Bruce N. Wilson, Niagara Falls, and Edward J. Quinn, Tonawanda, N.Y., assignors to Hooker Chemical Corporation, Niagara Falls, N.Y., a corporation of New York
No Drawing. Filed Jan. 26, 1968, Ser. No. 700,703
Int. Cl. C08g 22/12
U.S. Cl. 260—75           8 Claims

ABSTRACT OF THE DISCLOSURE

Moisture curable polyurethane coatings are produced by reacting excess organic polyisocyanate with a polyhydroxy composition of ingredients comprising (1) nitrilotriacetic acid and (2) a polyhydric alcohol.

BACKGROUND

Moisture curable polyurethane coating compositions are applied to various substrates such as metal, i.e., steel, aluminum, copper, brass and the like, wood, ceramics, glass, and to polymer compositions. Polyurethane compositions made from polyesters have to a very large extent been replaced by those made from polyethers because, as a class, the polyethers are more economical and provide better properties. It was discovered that economical moisture curable polyurethane could be produced by employing nitrilotriacetic acid, a result unexpected because of the presence of the tertiary nitrogen atom in the nitrilotriacetic acid. The tertiary nitrogen atom is a basic catalyst which will cause any free isocyanate groups to dimerize and/or trimerize. It was therefore expected that a polyurethane made from nitrilotriacetic acid would deteriorate upon storage.

It is the object of this invention to provide novel polyurethane coating compositions that can be cured by atmospheric moisture or by suitable polyols to provide cured coatings that have good corrosion resistance and adhesion to metal surfaces. It is a further object of the invention to provide economical polyester-based moisture curable polyurethane coating compositions. These and other objects of the invention will be apparent from the following detailed description.

SUMMARY

This invention relates to new moisture curable polyurethane coatings. More particularly, the invention relates to moisture curable polyurethane coatings produced by reacting excess organic polyisocyanate with a polyhydroxy composition of ingredients comprising (1) nitrilotriacetic acid and (2) a polyhydric alcohol.

DESCRIPTION OF THE PREFERRED EMBODIMENTS

In accordance with this invention, there is provided a polyurethane coating composition produced by reacting excess organic polyisocyanate with a polyhydroxy composition, wherein the polyhydroxy composition comprises a polyester of ingredients comprising (1) nitrilotriacetic acid and (2) a polyhydric alcohol. Generally, the reaction of the organic polyisocyanate and polyhydroxy composition is carried out in the presence of a suitable solvent which also serves as a liquid medium or diluent for the polyurethane coating composition. The resulting products are readily curable by atmospheric moisture to provide the cured polyurethane coating. Alternatively, the products can be cured by reaction with suitable polyols.

The alcohols employed in the polyester can, in general, comprise any polyhydric alcohol. Typical examples include ethylene glycol; diethylene glycol; triethylene glycol; tetraethylene glycol; propylene glycol; dipropylene glycol; polypropylene glycol; hexylene glycol; 2-methyl-2-ethyl-1,3-propanediol; 2-ethyl - 1,3 - hexanediol; 1,5-pentanediol; thiodiglycol; 1,3-propanediol; 1,3-butanediol; 2,3-butanediol; 1,4-butanediol; 1,3-butylene glycol; neopentyl glycol; 1,2-dimethyl-1,2-cyclopentanediol; 1,2-cyclohexanediol; 1,2 - dimethyl - 1,2 - cyclohexanediol; glycerol; trimethylolpropane; trimethylolethane; 1,2,4-butanetriol; 1,2,6-hexanetriol; pentaerythritol; dipentaerythritol; tripentaerythritol; anhydroenneaheptitol; mannitol; sorbitol; methylglycoside; like compounds apparant to those skilled in the art; and mixtures thereof. Generally, the polyhydric alcohols have 2 to 6 hydroxyl groups.

The preferred polyhydric alcohols are glycols such as dipropylene glycol, neopentyl glycol, and the like. It has been found that glycols having hydroxy groups on adjacent carbon atoms exhibit relatively poor solubility in the commonly used coating solvents, described hereinbelow, and therefore, it is preferred to employ glycols having at least one carbon atom without hydroxyl substitution between the hydroxyl groups, i.e., at least 1,3 hydroxyl separation. Additionally, one mole of a monohydroxy alcohol, such as n-butyl alcohol, and 2 moles of glycol can be employed for each mole of nitrilotriacetic acid to render the polyesters substantially linear.

Auxiliary carboxylic compounds can be employed in conjunction with the nitrilotriacetic acid. Suitable carboxylic compounds can be either an acid, acid anhydride, acid halide or mixtures thereof; can be aliphatic, cycloaliphatic, aromatic, or heterocyclic, and can be either saturated or unsaturated. Among the compounds which can be employed are the respective acids, anhydrides and halides of adipic, succinic, glutaric, oxalic, malonic, maleic, fumaric, phthalic, isophthalic, terephthalic, tetrachlorophthalic, chlorendic, and the like.

In the esterification reaction, the ratio of carboxyl to hydroxyl groups can vary over a wide range, however, the ratio is at least about 3:4. A typical esterification procedure comprises: a reaction vessel is fitted with a stirrer, nitrogen inlet tube, thermometer, water cooled condenser, cooled receiver connected to the condenser, and heating means. The nitrilotriacetic acid and polyhydric alcohol are charged into the vessel and heated under agitation and an inert nitrogen sparge until a clear homogeneous ester results. The vessel is then cooled and the product recovered. The temperature can range from about 125 to about 200 degrees centigrade, although temperatures of about 160 to about 180 degrees centigrade are preferred. The time necessary to complete the above-described esterification reaction can vary from 1 to 36 hours, although times of about 3 to about 30 hours are preferred and times of about 4 to about 20 hours are most preferred. Additionally, a conventional esterification catalyst, such as phosphoric acid, p-toluenesulfonic acid, methanesulfonic acid, hexanesulfonic acid, benzenesulfonic acid, 4-chlorobenzene sulfonic acid, chlorosulfonic acid, 2-naphthalene-methanesulfonic acid, 1,6-naphthalene sulfonic acid, borontrifluoride, lead oxide, antimony oxide, stannic chloride, silver oxide, and the like, can also be employed.

The polyester polyol that results from the esterification reaction is dissolved in a solvent that will provide a suitable carrier for the finished polyurethane coating composition. Suitable solvents include alkanes, such as hexane, octane, and the like; aromatic hydrocarbons such as toluene and xylene; esters of a carboxylic compound and an alcohol such as ethylene glycol monoethylether acetate, ethyl acetate, butyl acetate, ethylpropionate, ethyl butyrate, and the like; ketones such as aliphatic ketones having 1 to 8 carbon atoms per aliphatic group, for example, acetone, methylethyl ketone, dibutyl ketone, methylhexyl ketone, and the like; chlorinated hydrocarbons such as trichloroethylene, perchloroethylene and the like; and the like solvents. Generally, the solvent is employed in a proportion to provide about 10 to 80 weight percent solids or non-volatiles as determined by ASTM D–1644–59 (method A). More usually the range is about 25 to 75 weight percent solids.

To improve the storage stability of the final polyurethane coating compositions, the solution of polyester polyol is preferably dehydrated to reduce the water content thereof to a value of less than about 100 parts per million of water in the polyol solution. More preferably, the water content of the polyol solution is reduced to a value in the range of about 10 to about 75 parts per million of water in the polyol solution. The dehydration step is conveniently achieved by subjecting the polyol solution to an azeotrope distillation. Such distillation is generally carried out at a temperature in the range of 70 to 200 degrees centigrade and atmospheric pressure. However, higher and lower pressures, such as up to 30 pounds per square inch absolute can be used, and the temperature will vary accordingly. Preferably the distillation conditions are 70 to 160 degrees centigrade and atmospheric pressure. Other dehydration methods are useful including subjecting the polyol solution to chemical dehydrating agents such as molecular sieves, zeolites, and the like.

The polyester polyol is reacted with an organic polyisocyanate. Suitable polyisocyanates include the tolylene diisocyanates, particularly 2,4-tolylene diisocyanate; 2,6-tolylene diisocyanate and mixtures of the 2 isomers, especially mixtures of 80 percent of 2,4-isomer and 20 percent of 2,6-isomer. Crude mixtures which are commercially available are also useful. Other suitable polyisocyanates include methylene bis(4-phenylisocyanate); hexamethylene diisocyanate; 1,5-naphthalene diisocyanate; 1,3-cyclopentylene diisocyanate; dimer acid diisocyanate; p-phenylene diisocyanate; 2,4,6-tolylene triisocyanate; 4,4',4''-triphenylmethane triisocyanate, as well as crude commercial mixtures of such organic polyisocyanates.

The organic polyisocyanate and the polyol component of a polyurethane composition are reacted in a suitable proportion to provide an excess of isocyanato groups based on the total number of hydroxyl groups or other equivalent groups, i.e., polycarboxylic, and the like. Generally, the components are employed in a proportion to provide greater than 1.5 isocyanato groups per hydroxyl or equivalent groups. By equivalent groups is meant carboxylic acid, carboxylic anhydride, amine, and the like groups that are reactive with the isocyanato groups. Preferably, the ratio is in the range of about 1.7 to about 2.5 isocyanato groups per hydroxyl or equivalent group. Generally, the organic polyisocyanate is added to the polyol solution, but the polyol solution can also be added to a body of the organic polyisocyanate. The reaction is preferably conducted at moderate temperatures in the range of about 25 to about 120 degrees centigrade, and preferably the temperature is in the range of 40 to about 80 degrees centigrade.

The polyurethane coating compositions of the invention can be applied to various substrates such as metal, i.e., steel, aluminum, copper, brass, and the like, wood, ceramics, glass, and to polymer compositions. The coating composition can be cured merely by exposure to atmospheric moisture. Alternatively, the coating compositions can be cured with the aid of a suitable polyol, such as a dihydric alcohol, e.g., ethylene glycol, propylene glycol, butane diol, dipropylene glycol, other polypropylene glycols, polybutylene glycols, and the like. Other polyols known in the art can also be employed.

The following examples serve to further illustrate the invention but are not intended to limit it. All parts are by weight and temperatures are in degrees centigrade unless otherwise indicated.

Example 1

A charge of 312.3 parts neopentyl glycol, 191.4 parts nitrilotriacetic acid, and 2.8 parts of 98 percent phosphoric acid was placed into a 3 neck flask equipped with a stirrer, thermometer, nitrogen gas inlet, water cooled condenser, cooled receiver connected to the condenser, and heating means. The flask was heated under a constant slow flow of nitrogen and with stirring to 172–190 degrees centigrade and maintained at that temperature for 3 hours. Thereafter the reaction mixture was cooled to room temperature and the resulting nitrilotriacetic polyol exhibited the following properties:

Gardner viscosity _____ 29
Gardner color _____ 1
Hydroxyl number _____ 285
Acid number _____ 6.6
Solubility _____ Very soluble [1]

[1] In ethylene glycol monoethyl ether acetate and in mixtures of xylol and ethylene glycol monoethyl ether acetate.

Example 2

A charge of 101.3 parts of the nitrilotriacetic acid polyol of Example 1 was admixed with 124.2 parts of ethylene glycol monoethyl ether acetate and 98.0 parts of xylol and the resulting solution was azeotroped under a nitrogen blanket for 3 hours. During this process, 44.0 parts of xylol (containing some water) were removed. The remaining solution was charged into an addition funnel installed upon a three-necked flask equipped with a stirrer, thermometer, nitrogen inlet, reflux condenser, and drying tube placed on the condenser, which had been previously charged with 91.0 parts of toluene diisocyanate. The contents of the addition funnel were gradually added with stirring to the toluene diisocyanate at a temperature of 40±2 degrees centigrade. The azeotrope flask was washed with 20.2 parts of ethylene glycol monoethyl ether acetate, and the wash was added to the stirring reaction flask through the addition funnel. The reaction mixture was stirred for a period of 5⅓ hours at 40±2 degrees centigrade. A moisture curable polyurethane prepolymer was produced.

Example 3

The polyurethane prepolymer of Example 2 was subjected to atmospheric moisture and cured to form a thin coating.

Example 4

The procedure of Examples 1, 2 and 3 was repeated employing dipropylene glycol in place of the neopentyl glycol. A polyurethane prepolymer was produced which was cured by exposure to atmospheric moisture.

Examples 5–7

Following the procedure of Examples 1–3, the following combinations of polyhydric alcohols and organic polyisocyanates can be employed with the nitrilotriacetic acid:

| Example | Polyhydric alcohol | Polyisocyanate |
| --- | --- | --- |
| 5 | 1,3-butanediol | Toluene diisocyanate. |
| 6 | 1,4-butanediol | Methyl bis (4-phenylisocyanate). |
| 7 | 1,5-pentanediol | Do. |

Various changes and modifications can be made in the process and products of this invention without departing from the spirit and scope of the invention. The various embodiments of this invention disclosed herein serve to further illustrate the invention but are not intended to limit it.

We claim:
1. A moisture curable polyurethane product of ingredi- ents comprising (A) a polyester polyol of ingredients comprising (1) nitrilotriacetic acid and (2) a polyhydric alcohol, and (B) an organic polyisocyanate in a proportion to provide greater than 1.5 isocyanate groups for each hydroxyl or equivalent group in the hydroxyl containing component.

2. The polyurethane product of claim 1 wherein said (2) polyhydric alcohol is a glycol and contains at least one carbon atom free from hydroxyl substitution between the hydroxyl groups.

3. The polyurethane product of claim 2 wherein said glycol is neopentyl glycol.

4. The polyurethane product of claim 2 wherein the glycol is dipropylene glycol.

5. The polyurethane product of claim 2 wherein the polyisocyanate is toluene diisocyanate.

6. A coating composition comprising the polyurethane product of claim 1 and a solvent.

7. A coating composition comprising the polyurethane product of claim 1 when cured with atmospheric moisture.

8. An article comprising the cured polyurethane product of claim 1 adherently bonded to a substrate.

References Cited

UNITED STATES PATENTS

| | | | |
|---|---|---|---|
| 2,407,645 | 9/1946 | Bersworth | 260—534 |
| 2,901,467 | 8/1959 | Croco | 260—77.5 |
| 3,015,650 | 1/1962 | Schollenberger | 260—75 |
| 3,142,652 | 7/1964 | Pace | 260—22 |

OTHER REFERENCES

Chemical Abstracts, vol. 44, Apr. 10, 1950, pp. 2911–2912.

Dombrow, Polyurethanes, 2nd edition, Reinhold, New York (1965), pp. 161–171.

Vieweg et al., Polyurethanes, Carl Hanser, Munich (1966), pp. 717–733.

DONALD E. CZAJA, Primary Examiner

H. S. COCKERAM, Assistant Examiner

U.S. Cl. X.R.

117—161; 161—190; 260—29.2, 31.2, 31.4, 32.8, 33.6, 33.8